3,024,212
WATERPROOFING STARCH ADHESIVE CONTAINING UREA-FORMALDEHYDE CONDENSATE AND TRIMETAPHOSPHATE SALT AND PROCESS OF MAKING SAME
Eugene F. Paschall, Orland Park, and William H. Minkema, La Grange, Ill., assignors to Corn Products Company, a corporation of Delaware
No Drawing. Filed Mar. 25, 1959, Ser. No. 801,704
6 Claims. (Cl. 260—17.3)

This invention relates to a new and improved alkaline setting adhesive which imparts water-resistant or waterproofing characteristics to paper products, particularly to corrugated paper board. Such adhesives after curing do not rehydrate when, for example, the paper boards which they bind together are immersed in water. More specifically our invention relates to waterproofing compositions comprising starch polymers, an alkaline curing catalyst, water-soluble trimetaphosphates and urea-formaldehyde partially condensed resin or urea-formaldehyde monomers.

One object of this invention is to prepare adhesives which, when used in the production of water-resistant corrugated board, will form a bond which resists hydration when immersed in cold water for 24 hours. A second object is to prepare potential adhesives which set rapidly at elevated temperatures so that water-resistant board can be made at an increased rate of production. A third object is to prepare potential adhesives under highly alkaline conditions so that the gel point of the raw starch portion of the corrugating mix is between about 142° F. to 152° F. A still further object is to prepare potential waterproofing adhesives which show, in addition to the aforementioned desirable characteristics, a long pot life and a stable viscosity. These and other objects, as described hereinafter, are provided for by the novel adhesives of this invention.

Starch adhesives for making corrugated paper board have been described in the patents of Jordan V. Bauer, assigned to Stein, Hall U.S. Patents 2,051,025; 2,102,937 and 2,212,557. In the Stein, Hall process, a carrier starch (prepared by gelatinizing starch in the presence of heat and caustic soda) and raw starch are the principal components for making non-waterproof corrugated board. The primary function of the carrier starch is to hold the ungelatinized starch component in suspension and to impart desirable viscosity characteristics so that the adhesive can be applied on conventional corrugating machines. Caustic soda, used to gelatinize the carrier starch, in addition, functions to lower the gelatinization temperature of raw starch. In addition to caustic, borax is added to increase the viscosity and fluidity of the adhesive and to improve its adhesiveness. Borax, also, causes the raw starch to gelatinize more rapidly. Thus, when the adhesive is applied to the tips of the corrugations and, then, after the liner comes in contact with the tips and heat is applied, the starch readily gelatinizes. By this "in situ gelatinization" a much stronger bond between medium and liner is formed than when pasted starch alone is used.

For optimum performance of either a waterproofing or non-waterproofing corrugating adhesives, the ratios of pasted or carrier starch to raw starch, caustic to starch and starch to water should be within certain limits. These limits have been well defined in the past and include (1) gel point within the range of 142° to 155° F., (2) viscosity (as determined in a Stein, Hall viscosity cup) within the range of about 25 to 50 seconds, and (3) a starch to water ratio of about 1 to about 3 to 4, and (4) a ratio of carrier starch to raw starch of about 1 to 5. Applicants' new waterproofing adhesive possesses all of these desirable properties, in addition to others, so that it can be readily applied on conventional corrugating equipment at normal operating speeds to produce waterproof board.

Our invention is based upon the discovery that if a urea-formaldehyde resin or monomer and water-soluble trimetaphosphate are incorporated in a standard corrugating adhesive, a superior waterproofing adhesive is obtained. It sets rapidly at high pH values and, yet, possesses a pot life of several hours. Preferably, the resin or monomer should be cationic.

It has been proposed in the past to incorporate various thermosetting monomers and partially condensed polymers with starch based corrugating adhesives to make them waterproof. When this was done, the adhesives were adversely affected in one or more ways. Generally, it was necessary to operate at greatly reduced machine speeds to make satisfactory waterproof board.

For example, it has been proposed to incorporate urea-formaldehyde monomers and partially condensed polymers and an acid curing catalyst in starch based corrugating adhesives. Acid catalysts are known to increase the rate of cure of aminoplast resins. However, the presence of acid catalysts decreases the tack of the paste making it difficult to form a good glue line between the fluted medium and liner board. Furthermore, the gel point of the raw starch component is increased to 170°–180° F. Using such waterproofing adhesives, it is necessary to reduce the speed of the corrugator from 400–500 feet to about 150 feet per minute to allow more time for the starch to heat gelatinize.

It has been proposed to overcome the deficiency of the high gel point by using alkaline-setting ketone-formaldehyde resins. However, these resins are not sufficiently reactive under alkaline conditions to make waterproof board using normal production speeds, particularly at the single facer. Stated differently, it is necessary to slow the corrugator down so that more heat can be applied to properly cure the resin. The novel waterproofing corrugating adhesives of our inventions comprising starch, an alkaline catalyst, water-soluble trimetaphosphate and a urea-formaldehyde resin or monomer, particularly a cationic urea-formaldehyde resin, set rapidly under alkaline conditions. In addition, the ingredients are inexpensive making the adhesive attractive to the corrugating trade.

It is not known with certainty why the particular combination of cationic urea-formaldehyde resin and trimetaphosphate in a starch based adhesive functions so effectively. One possible explanation is that cross-linking of the starch-resin matrix occurs by the following combination of reactions under alkaline pH conditions during bond formation: (1) The starch hydroxyl groups are cross-linked with trimetaphosphate to form negatively charged phosphate diester derivatives. (2) Resinification of cationic-urea-formaldehyde resin occurs at elevated temperature. (3) Ionic interaction of positively charged resin occurs with negatively charged diester groups on starch resulting in formation of an insoluble ionic complex.

Although this theory may fully or partially explain the reaction mechanisms, we do not wish to be bound by any particular theory or explanation. We have observed repeatedly that the use of a combination of cationic urea-formaldehyde resin and sodium trimetaphosphate, for example, results in a better waterproofing adhesive than other urea-formaldehyde resins combined with trimetaphosphate. This indicates that, in addition to the first two possible mechanisms mentioned above, the ionic mechanism is also involved with the cationic resins. We wish to point out, however, that the waterproofing potential of any urea-formaldehyde resin or monomer used in our invention is enhanced by the presence of water-soluble trimetaphosphate so that these combinations are also within the scope of our invention.

It is essential to use sufficient strongly basic catalyst to give a pH to the adhesive in the range of about 11.2 to 12.4. The preferred range is about 11.7 to 12.0. A pH higher than about 12.4 is generally detrimental since it may cause undesirable swelling of the granular starch either when the carrier is added to the raw starch slurry or when the adhesive is in storage tanks or the paste pans, particularly at the single facer. Thus, the critical upper limit of catalyst concentration is the maximum amount that will not swell or gelatinize the granular starch before the glue line is formed. The upper and lower limits, with respect to catalyst concentration to give the desired pH, vary with the type of catalyst. For example, when using lime or a mixture of lime and caustic, the preferred amount is about 3.0 to 3.6 percent based on starch. This amount gives a pH within the range of about 11.7 to 12.0. A pH lower than about 11.2 does not give adequate waterproofing results at normal machine speeds.

A variety of catalysts may be used to adjust the pH to the desired range; for example, sodium hydroxide, potassium hydroxide, a mixture of sodium carbonate and lime or sodium hydroxide, trisodium phosphate; however, we prefer to use a mixture of lime and caustic. When a mixture of lime and caustic is used, the composition has both tack and waterproof potential. If lime alone is used, very little tack or adhesiveness, is obtained although good waterproofing results. Borax can be added to the formulation to improve the adhesive performance. We have found it advantageous to heat the carrier starch with borax and then add sodium hydroxide or a mixture of sodium hydroxide and lime and continue heating until the starch is gelatinized. The resulting adhesive has better adhesive has better viscosity and fluidity characteristics than an adhesive prepared similarly without borax.

If caustic alone and thick-boiling starch are used in the carrier preparation, the resulting adhesive after resin addition is difficult to thin to the desired viscosity by agitation. However, by using a thin-boiling starch and sodium hydroxide in the carrier, the adhesive will not thicken detrimentally for several hours.

The amount of resin employed may vary over a wide range depending on the activity of the particular resin, the extent of waterproofing desired and the machine speed of the corrugator. It has been our experience that more than about 15 percent of dry resin, based on dry starch, does not improve nor decrease waterproofing results but only adds to the cost. Generally, from 3 to 8 percent dry resin, based on the dry starch, gives the desired results although our invention is not limited thereto.

The amount of water-soluble trimetaphosphate may vary over a wide range. We see no practical advantage in using less than about 1.5 percent nor more than about 4 percent, based on dry weight of starch. Optimum performance of the adhesive on all counts is observed when about 2.5–3.0 percent is used. The data tabulated below in Table I show that improvement in waterproofing results is achieved by using as little as 0.2 percent (0.003 mole per mole of anhydroglucose residue). More than about 8 percent (0.12 mole per mole of anhydro-glucose residue) sodium trimetaphosphate adversely affects the gel point. With the exception of sodium trimetaphosphate concentration, each experiment was carried out as described in Example I.

TABLE I

*Influence of STMP Concentration on Waterproofing Potential*

| Experiment | STMP, percent on starch | pH of adhesive | After 1 hr. gel point °F | Waterproofing [1] | |
| --- | --- | --- | --- | --- | --- |
| | | | | Short cure | Long cure |
| 3A | 0 | 11.9 | 148 | 40 | 40 |
| 5A | 0.2 | 11.9 | 146 | 50 | 50 |
| 5B | 0.6 | 11.9 | 146 | 60 | 65 |
| 3B | 1.2 | 11.9 | 144 | 60 | 65 |
| 7A | 1.8 | 11.9 | 144 | 75 | 80 |
| 8B | 2.4 | 11.9 | 144 | 85 | 90 |
| 7B | 3.6 | 11.8 | 145 | 80 | 85 |
| 6A | 4.8 | 11.8 | 147 | 70 | 75 |
| 6B | 8.0 | 11.6 | 156 | 60 | 60 |

[1] Ratings are based on 100 as representing essentially the maximum water resistant bond which can be achieved under commercial conditions The gel point of the adhesive after one hour may range from 142° to 152° F., the preferred range being 144° to 148° F. The gel point increases with storage time of the adhesive and may increase to about 154° F. without decreasing waterproofing results.

The viscosity of the adhesive as measured in a Stein, Hall cup may range from 18 to 90 seconds, the preferred range being 25 to 50.

Although we do not wish to be bound by any order of mixing, best results are observed when the following order of mixing is used: The alkaline catalyst and carrier starch are mixed and heated to 145° to 160° F. and held at this temperature with agitation until the starch is gelatinized. This generally requires 10 to 20 minutes. Cooling water is then added to the carrier to reduce the temperature to 110° to 135° F. Then the carrier is added slowly to a slurry of raw starch and sodium trimetaphosphate, for example, and mixed with vigorous agitation. When completely mixed, resin is added and the mixture agitated until the desired viscosity is reached.

The starches applicable to our invention include those normally used in the corrugated trade such as, for example, corn, potato, waxy maize, grain sorghum and tapioca. The starches may be raw or modified by treatment with acids, oxidizing agents and the like. Both the carrier and the ungelatinized starches may also include starch derivatives such as, for example, starch ethers. The carrier starch may be in granular or pregelatinized form such as may be obtained by gelatinizing starch, then drying, such as by spray or roll-drying on heated rolls.

The following examples are of an informative nature only and in no way limit the scope of the invention.

*Example 1*

This example illustrates the preferred embodiment of our invention with respect to amount and type of ingredients and the preferred order of mixing. The amount of caustic plus lime based on starch is 3.3 percent and the ratio of caustic to lime is 1.3. Seven and one-half percent cationic resin and 2.5 percent sodium trimetaphosphate, based on total starch solids are employed in this example.

*Carrier preparation.*—Eighty parts of raw corn starch was slurried in 460 parts of water and 12 parts of $Ca(OH)_2$ added. Then, 4 parts of NaOH in 20 parts of water added and the mix heated to 154° F. The carrier was cooked at 154° F. for 15 minutes with vigorous agitation. Then, 200 parts of cooling water was added and the carrier stirred (without heating) until the temperature dropped to 118° F.

*Bottom preparation.*—Four hundred parts of raw corn starch was slurried in 800 parts of water and 12 parts of sodium trimetaphosphate added. After 5 minutes, the carrier starch was slowly added to the slurry with rapid mixing. After an additional 5 minutes, 125 parts of a cationic urea formaldehyde resin sold under the trademark Uformite 700 was added as a 30 percent solids syrup. The formulation was then rapidly agitated until the viscosity (Stein, Hall) was 40-45 seconds.

The adhesive was recirculated at 110° F. in a laboratory pumping machine. At various intervals a portion of the paste was removed and evaluated with respect to viscosity, pH, gel point and waterproofing. The procedure used for determining waterproofing is as follows:

*Evaluation of waterproofing.*—Corrugated medium taken from the single facer end of the corrugator machine and heavy liner board used for doublebacker are cut in 4-inch squares. The adhesive is applied on a glass plate with a film applicator in a film 0.012-inch thick. The medium is then laid on the film so that the ridges of the corrugations are in contact with the adhesive. The web side of the liner board is then brought in contact with the corrugations and the combination, with the adhesive side down, placed on a hot plate at 350° F. under a 2-kilogram weight for 5 seconds. After curing 24 hours at room temperature, the board is soaked in cold running water for 24 hours and the wet strength of the bond evaluated. The ratings used are defined as in Table I.

The results of the evaluation are as follows:

| Age of adhesive, hr. | Viscosity, sec. Stein-Hall | pH | Gel point °F. | Rating 1 hr. | After 24 hr. |
|---|---|---|---|---|---|
| 0.5 | 30 | 11.8 | 142 | 80 | 80 |
| 2.0 | 42 | ---- | 143 | 90 | 80 |
| 3.5 | 38 | 11.8 | 146 | 80 | 80 |
| 5.5 | 35 | 11.8 | 148 | 70 | 70 |
| 7.0 | 41 | 11.8 | 149 | 80 | 80 |
| 8.5 | 46 | 11.8 | 148 | 80 | 80 |
| 12.0 | 55 | 11.75 | 149 | 80 | 90 |
| [1] 24.5 | ([2]) | 11.6 | 155 | 80 | 80 |

[1] High viscosity after 24.5 hours believed due to loss of water by evaporation.
[2] Too thick.

*Example II*

The procedure of Example I was repeated except that the amount of caustic plus lime was increased from 3.3 to 4.2 percent while maintaining a 1:3 ratio of caustic to lime. After 2 hours pumping, the gel point of the formulation was 144° F. Waterproofing rating was 90. Examination of the adhesive showed the presence of partially swollen starch granules, indicating that the amount of caustic plus lime used was about the upper limit for a 1:3 ratio of caustic to lime.

*Example III*

This example illustrates the use of a thin-boiling starch for the carrier and NaOH alone as alkaline catalyst.

*Carrier.*—Forty parts of acid modified corn starch (7 fluidity) was slurried in 220 parts of water. Then, 6 parts of NaOH dissolved in 20 parts of $H_2O$ was added. The slurry was heated to 154° F. and held 15 minutes at this temperature under moderate agitation. The paste was cooled to 118° F. with 100 parts of cold water before adding to the bottom slurry.

*Bottom.*—Two-hundred parts of unmodified corn starch and 6 parts of sodium trimetaphosphate were slurried in 400 parts of water at 100° F. The carrier paste was added slowly to the slurry which was under vigorous agitation. After stirring for 5 minutes, to insure adequate dispersion, 60 parts of Uformite 700 resin was added. The formulation thickened slightly during resin addition, but thinned on stirring. After stirring for 1 hour, the formulation gave a waterproofing value of 80 when tested as described in Example I.

*Example IV*

The procedure in Example III was repeated except that the acid modified starch had a fluidity of 20. The final formulation gave a waterproofing value of 80.

*Example V*

Example I was repeated except that the urea-formaldehyde resin was omitted. The formulation was evaluated in the same manner as previously described. Waterproofing results after 1 hour were completely unsatisfactory showing that the presence of the resin is necessary for making waterproof board.

*Example VI*

Example I was repeated except that trimetaphosphate was omitted. After 1 hour, waterproofing rating was 40 showing that a composition containing the cationic resin alone is inferior to a formula containing both a cationic urea-formaldehyde resin and trimetaphosphate.

*Example VII*

This example illustrates the preparation of an alkaline corrugating adhesive using sodium trimetaphosphate and a spray dried ureaformaldehyde resin, marketed under the trademark Urac 110.

*Carrier.*—Ten parts of unmodified corn starch was slurried in 50 parts of water. Then, 1 part of NaOH dissolved in 10 parts of $H_2O$ was added. The slurry was heated to 160° F. and stirred 15 minutes at this temperature. The paste was diluted and cooled with 40 parts of cold water.

*Bottom.*—A slurry containing 50 parts of unmodified corn starch and 1 part of sodium trimetaphosphate in 110 parts of water was prepared, the carrier starch was slowly added to the slurry. Eight parts of Urac 110 and 1 part of $Ca(OH)_2$ were added and the mixture stirred for 1 hour and evaluated. Waterproofing rating was 60.

*Example VIII*

This example illustrates the preparation of an alkaline adhesive in which dimethylol urea replaced the cationic urea-formaldehyde resin.

The procedure of Example I was repeated except that 36 parts of dry dimethylol-urea replaced the cationic urea-formaldehyde resin. After stirring for 1 hour, waterproofing rating was 60.

*Example IX*

Example VIII was repeated except sodium trimetaphosphate was omitted. After stirring 1 hour, waterproofing results were poor. Thus, it will be noted that the presence of sodium trimetaphosphate increases the waterproofing potential of an adhesive containing dimethylol urea.

*Example X*

This example illustrates the preparation of an alkaline setting corrugating adhesive using sodium trimetaphosphate and a cationic urea-formaldehyde resin sold under the trademark Accobond 3914. Lime was used as the alkaline catalyst.

*Carrier preparation.*—Forty parts of unmodified corn starch and 8 parts of $Ca(OH)_2$ were slurried in 240 parts of water. The slurry was heated to 155° F. and stirred at this temperature for 15 minutes. Then, 100 parts of cooling water was added.

*Bottom preparation.*—Two hundred parts of unmodified corn starch was slurried in 400 parts of water. After mixing for 4 minutes, the carrier starch was slowly mixed with the slurry. After 5 minutes, 44 parts of Accobond 3914 resin, mixed with 6 parts of sodium trimetaphosphate, was added. The adhesive was stirred 3 hours at 110° F. and evaluated. After soaking the test specimens for 24 hours in cold water, considerable fiber pull was observed when the medium and liner board was separated, thus indicating the test was entirely satisfactory.

*Example XI*

This example illustrates the preparation of a waterproofing adhesive using a pregelatinized roll-dried carrier starch for adaption to a one tank mixing unit.

A dry mix was prepared consisting of 200 parts of unmodified corn starch, 40 parts of roll-dried, thick-boiling corn starch, 6 parts of $Ca(OH)_2$, 2 parts of sodium carbonate and 6 parts of sodium trimetaphosphate. The ingredients were mixed 5 minutes in a Waring Blendor to obtain a homogeneous blend. The blend was added slowly to 640 ml. of water while agitating vigorously. After 5 minutes, 60 parts of Uformite 700 resin was added and the formulation stirred 90 minutes at 110° F. Waterproofing rating was 90.

*Example XII*

The following waterproofing adhesive was prepared in accordance with this invention and used in a corrugating plant.

*Carrier portion.*—Eighty pounds of unmodified corn starch was slurried in 55.5 gallons of water and 12 pounds of $Ca(OH)_2$ added. This mixture was stirred 10 minutes and 4 pounds of NaOH, dissolved in 2 gallons of water, added. The temperature was raised to 156° F. and the paste stirred 15 minutes. The paste was cooled to 128° F. by the addition of 18.3 gallons of water. After stirring 5 minutes, the paste was transferred to the lower mixing tank.

*Lower mixing tank.*—Four hundred pounds of unmodified corn starch was slurried in 96 gallons of water and a small portion of carrier and 12 pounds of sodium trimetaphosphate were added. The remainder of the carrier was dropped and the adhesive agitated 5 minutes. Then, 120 pounds of Uformite 700 resin was added. The adhesive was stirred 20 minutes. The Stein, Hall viscosity before and after resin addition was 25 seconds. The formulation was used to make waterproof board at a machine speed of 225 feet per minute. The corrugated board at both the single facer and double backer had good water resistance (value of 90) after soaking in cold water for 24 hours.

*Example XIII*

This example illustrates the use of borax to improve the tack of the adhesive.

The procedure of Example I was repeated except that 4 parts of borax was added, in addition to caustic and lime, to the carrier starch slurry prior to cooking. After adding the carrier starch to the raw starch slury containing sodium trimetaphosphate, Uformite resin 700 was added and the adhesive stirred one hour. The formula possessed better tack than the adhesive of Example I. Waterproof rating was 80.

*Example XIV*

The procedure of Example I was repeated except that 40 grams of carboxymethyl corn starch (D.S. 0.05) was used in the preparation of the carrier. The waterproof rating of the formulation was 80.

*Example XV*

The procedure of Example I was repeated except 40 grams of hydroxyethyl grain sorghum starch (D.S. 0.05) was used in the preparation of the carrier. The waterproof rating of the formulation was 80.

We claim:
1. An adhesive composition capable of imparting water resistance to bonds in corrugated paper products comprising 1 part of gelatinized starch as carrier, 4 to 6 parts of ungelatinized starch, a material from the group consisting of urea-formaldehyde partially condensed resin and dimethylol, a water-soluble trimetaphosphate in the ratio of 0.003 to 0.12 mole per mole of anhydroglucose residue, water in the ratio of 3 to 4 parts to 1 part of total solids, sufficient alkaline material to give the composition a pH of 11.2 to 12.4, said composition being capable of setting upon being heated.

2. An adhesive composition capable of imparting water-resistance to bonds in corrugated paper products comprising 1 part of gelatinized starch as carrier, 4 to 6 parts of ungelatinized starch, a cationic urea-formaldehyde partially condensed resin, a water-soluble trimetaphosphate in the ratio of 0.003 to 0.12 per mole of anhydroglucose residue, water in the ratio of 3 to 4 parts to 1 part of total solids, sufficient alkaline material to give the composition a pH of 11.2 to 12.4, said composition being capable of setting upon being heated.

3. The product of claim 1 wherein borax is incorporated in the gelatinized starch carrier.

4. A process for making a waterproofing adhesive composition which comprises making a carrier by gelatinizing starch, cooling the paste, mixing therewith ungelatinized starch, a material from the group consisting of urea-formaldehyde partially condensed resin and dimethylol, a water-soluble trimetaphosphate and an alkaline catalyst; the ratio of gelatinized to ungelatinized starch being between 1 to 4 and 1 to 6; the ratio of the trimetaphosphate being 0.003 to 0.12 mole per mole of anhydroglucose residue; the amount of alkaline catalyst being sufficient to provide a pH of 11.2 to 12.4; the ratio of water to total solids being between 3 to 1 and 4 to 1.

5. A dry mix capable when mixed with water of imparting water resistance to bonds in corrugated paper products comprising 1 part of pregelatinized starch, 4 to 6 parts of ungelatinized starch, a material from the group consisting of urea-formaldehyde partially condensed resin and dimethylol, a water-soluble trimetaphosphate in the ratio of 0.003 to 0.12 mole per mole of anhydroglucose residue, sufficient lime and sodium carbonate to give the composition a pH of 11.2 to 12.4 when mixed with water in the ratio of 3 to 4 parts to 1 part of total solids.

6. An adhesive composition comprising gelatinized starch, ungelatinized starch, an alkaline curing catalyst to give the composition a pH of 11.2 to 12.4, a water-soluble trimetaphosphate, and a material from the group consisting of urea-formaldehyde partially condensed resin and dimethylol urea.

References Cited in the file of this patent
UNITED STATES PATENTS

| | | |
|---|---|---|
| 2,102,937 | Bauer | Dec. 21, 1937 |
| 2,463,148 | Caesar et al. | Mar. 1, 1949 |
| 2,652,374 | Thompson | Sept. 15, 1953 |

FOREIGN PATENTS

| | | |
|---|---|---|
| 345,845 | Great Britain | Apr. 2, 1931 |

UNITED STATES PATENT OFFICE
CERTIFICATE OF CORRECTION

Patent No. 3,024,212                        March 6, 1962

Eugene F. Paschall et al.

It is hereby certified that error appears in the above numbered patent requiring correction and that the said Letters Patent should read as corrected below.

Column 8, lines 7, 29 and 42, after "dimethylol", each occurrence, insert -- urea --.

Signed and sealed this 19th day of June 1962.

(SEAL)
Attest:

ERNEST W. SWIDER
Attesting Officer

DAVID L. LADD
Commissioner of Patents